United States Patent [19]
Parsons

[11] 3,932,734
[45] Jan. 13, 1976

[54] BINARY PARALLEL ADDER EMPLOYING HIGH SPEED GATING CIRCUITRY

[75] Inventor: Brian Jeremy Parsons, Stevenage, England

[73] Assignee: Hawker Siddeley Dynamics Limited, England

[22] Filed: Mar. 8, 1974

[21] Appl. No.: 449,461

[52] U.S. Cl. .............................................. 235/175
[51] Int. Cl.² ......................................... G06F 7/50
[58] Field of Search ............ 235/175; 307/251, 313

[56] References Cited
UNITED STATES PATENTS

| | | | |
|---|---|---|---|
| 3,717,755 | 2/1973 | Briley | 235/175 |
| 3,743,824 | 7/1973 | Smith | 235/175 |
| 3,829,713 | 8/1974 | Canning | 307/251 |
| 3,843,876 | 10/1974 | Fette et al. | 235/175 |

Primary Examiner—David H. Malzahn
Attorney, Agent, or Firm—Rose & Edell

[57] ABSTRACT

In a binary parallel complementing L.S.I. adder, a C-MOS transmission gate is provided in each stage with its input and output directly connected to the carry in and carry out leads of the stage. The gate is switched by complementary control bits derived by stage input logic operating on the bits to be summed, whereby very fast passage of a carry through the stages is achieved. The transmission gate consists of p- and n- channel MOS transistors with their sources connected in common to the input and their drain electrodes likewise connected in common to the output.

3 Claims, 3 Drawing Figures

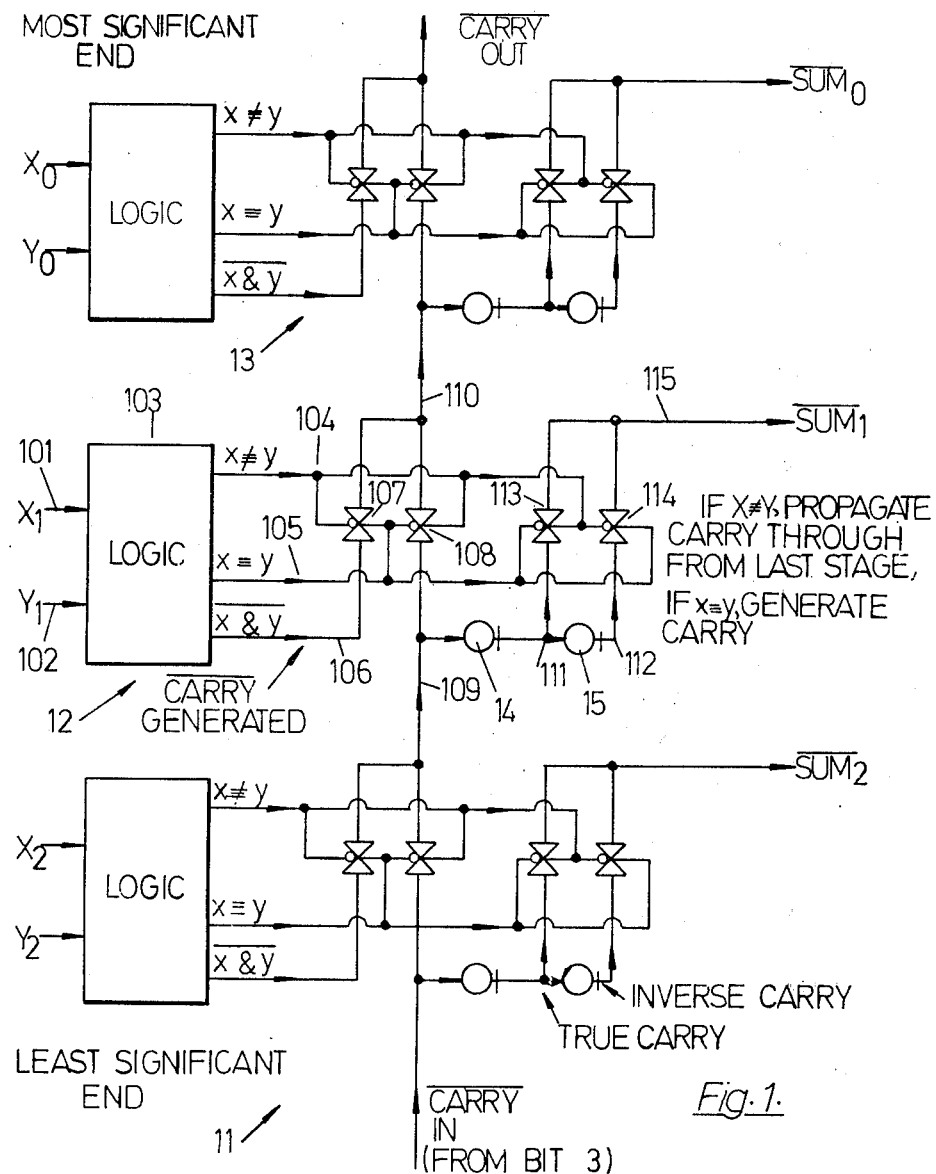
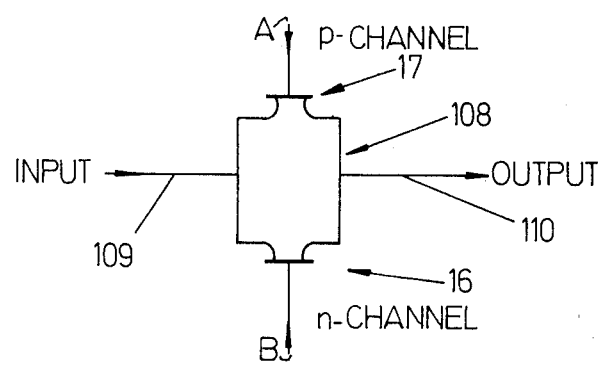
Fig. 1.
Fig. 2.

BINARY PARALLEL ADDER EMPLOYING HIGH SPEED GATING CIRCUITRY

This invention relates to adder circuits for arithmetic units in computers and to priority-determining circuits. It is especially, but not exclusively, concerned with the type of digital circuit known as a Kilburn adder (reference U.S. Pat. No. 3,053,452). The Kilburn adder is a digital circuit for use in computers etc., that carries out very fast addition of two parallel binary numbers. An object of the invention is to achieve an addition circuit approximately twice as fast as previous comparable large scale integrated (L.S.I.) adders, which have normally used 'block carry' techniques.

According to the present invention, there is provided a binary parallel L.S.I. adder or priority-determining circuit characterised in that each stage includes a complementary metal oxide semiconductor (C-MOS) transmission gate providing a fast carry path directly through from the carry input to the carry output of the stage.

Circuit arrangements according to the invention will now be described by way of example and with reference to the accompanying drawings, in which:

FIG. 1 is a circuit and block diagram of a parallel binary adder,

FIG. 2 shows the detail of one of the transmission gates used in the circuitry of FIG. 1.

Figure 3:
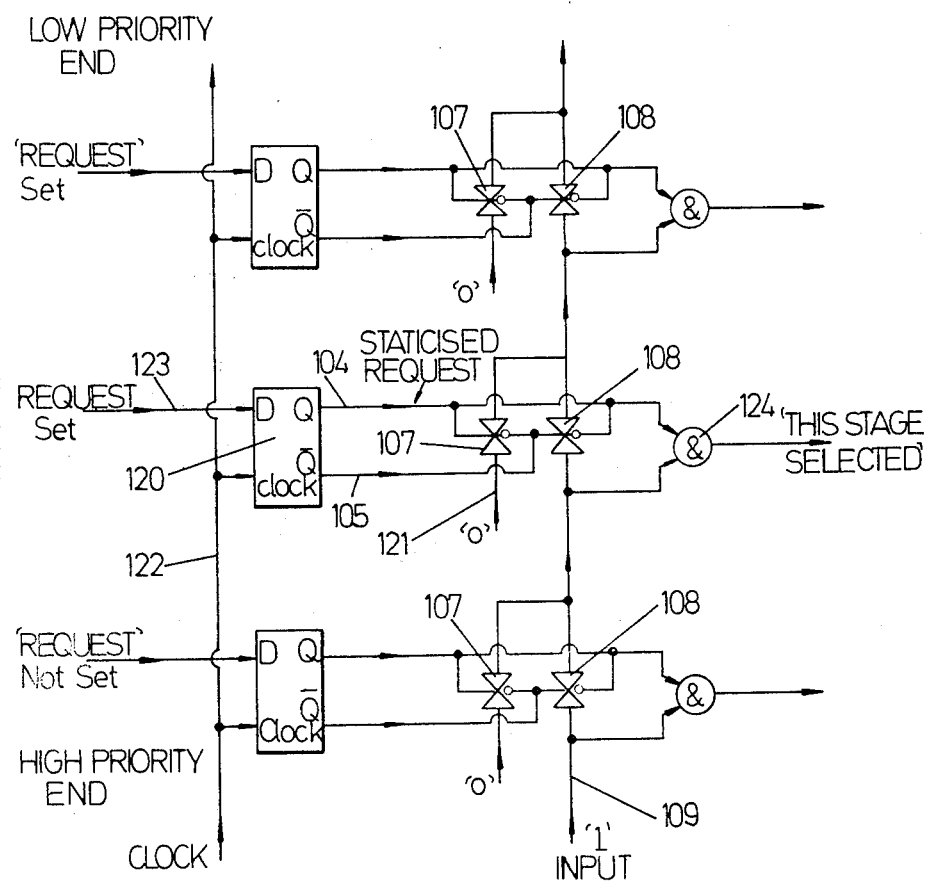
FIG. 3 is a circuit and block diagram of a priority-determining circuit.

Referring to FIG. 1, this shows three representative stages 11, 12, 13 of a complementing adder. The operation to be described refers to the middle stage 12. Two inputs to this stage, 101 and 102 (being corresponding binary digits $X_1$, $Y_1$ from the two input words to be added) are combined by a C-MOS logic network 103 to drive the intermediate outputs 104, 105 and 106, which are, respectively, the logical 'non-equivalence' of the two inputs, the logical 'equivalence,' and the logical 'NAND.' The intermediate outputs 104 and 105 operate C-MOS transmission gates 107 and 108 in such a way that if the two original inputs 101 and 102 were the same, the 'generated carry' on output 106 is sent on through gate 107 to the 'carry out' line 110, and if the two inputs were different, the 'carry in' to this stage on line 109 is set on to the carry out line 110. Once these transmission gates have been set to their correct states (in each stage of the adder), the 'carry in' and 'carry out' signals on lines 109, 110 for all stages settle very quickly to their correct logical conditions. When the settling is complete, the true and inverse phases of the 'carry in' signal, generated by inverters 14 and 15 at terminals 111 & 112, are combined with the intermediate outputs 104 & 105 at transmission gates 113 & 114 to form the correct 'sum' output on line 115.

The prime feature of this circuit is the use of the transmission gate 108 (as suitably duplicated in all stages of the adder), to propagate the 'carry in' signal through from stage to stage in the event of the inputs 101, 102, to the stages being logically different. The means of generating the intermediate signals on lines 104, 105 & 106 are secondary, as are the means of combining the settled carry signals at 111 & 112 with the intermediate bits on lines 104 and 105 to form the 'sum' output at line 115, and the means of gating the 'generated carry' from line 106 on to the 'carry output' line 110.

The invention includes, however, the use of the transmission gate in a similar manner to propagate the 'block carry' signal from one block to another in a block carry adder.

Referring now to FIG. 2, this shows a transmission gate, e.g. the gate 108 of FIG. 1, consisting of n-channel and p-channel MOS transistors 16, 17 with their sources connected in common to the input line 109 and their drain electrodes likewise connected in common to the output line 110, so that when gate A of transistor 17 is made negative (logical 0) and gate B of transistor 16 is made positive (logical 1), the INPUT 109 is connected to the OUTPUT 110, as with a switch, and when gate A is made positive and gate B negative the INPUT and OUTPUT are isolated from each other.

The invention is also applicable to a priority decision-making circuit which is like the counter described above in that it has a succession of stages each with its own input and through which a binary signal can be rapidly propagated by way of direct transmission gates equivalent to the gates 108 in FIG. 1. The arrangement then is that the non-priority stages have inputs fed to them such that a binary 1 is rapidly propagated through them, and this continues until arrival at a stage that is "flagging" for selection as a priority stage by having an input such that the binary 1 ceases to be propagated and thereafter a binary 0 is propagated through the following transmission gates. Thus, the selected priority stage is then identifiable by following logic circuitry because it is the stage that has a binary 1 on its input receiving the digit propagated to it by the preceding stages and a binary 0 on its output that carries the digit that the stage itself passes on to the succeeding stages.

The priority-determining circuit of FIG. 3 comprises a succession of stages each incorporating transmission gates 107, 108 arranged generally as in FIG. 1. However, in this circuit the stage signals to the transmission gates on lines 104 and 105 are derived from a respective flip-flop 120, and the internally generated 'carry' on line 106 of FIG. 1 is replaced by a constant 'zero' input 121. The flip-flop 120 receives one input from a clock pulse line 122 and the other from a 'request' line 123; if the stage is demanding selection, a 'one'signal on the 'request'line 123 causes a 'one' to appear on the line 104. The stage having the highest priority receives, on the equivalent on the 'carry in' line 109 of FIG. 1, a constant 'one' input.

If the highest priority stage does not have a 'one' on its request line 123, the 'one' on the carry in line 109 is immediately propagated through the transmission gate 108 of the stage to the next stage. This process continues through the stages in descending priority until a stage is reached where the request line carries a 'one'. Then the signal propagated to the next stage is the 'zero' on input line 121 of the stage on request, instead of the 'one' on line 109. The output of each stage is derived from a respective AND gate 124 which receives inputs from the 'carry in' line 109 of the stage and the line 104. The only stage of which the AND gate 124 delivers a 'one' output, indicating that the stage has been selected, is the stage highest in the priority order that carries a request signal on its input 123. This is the only stage that has a 'one' on both inputs of its AND gate. All the stages preceding it in priority have a 'zero' on line 104, while each of the stages lower in priority has a 'zero' at least on its 'carry in' line 109.

I claim:

1. Multi-stage circuitry for use in a binary digital system, comprising a succession of stages each including first and second C-MOS transmission gates, each said gate comprising a p-channel MOS transistor having source, drain and gate electrodes and an n-channel MOS transistor having source, drain and gate electrodes, with the source electrodes of said two transistors connected in common and the drain electrodes of said two transistors connected in common, each stage except the first further including an input line from a preceding stage connected to said source electrodes of said first transmission gate, each stage except the last further including an output line to the next succeeding stage connected to said drain electrodes of both said transmission gates, each said stage further including a stage control input connected to said source electrodes of said second transmission gate and two stage input lines carrying complementary binary signals connected respectively to the opposite gate electrodes of both transmission gates.

2. An adder circuit including multistage circuitry comprising a succession of stages each including first and second C-MOS transmission gates, each said gate comprising a p-channel MOS transistor having source, drain and gate electrodes and an n-channel MOS transistor having source, drain and gate electrodes, with the source electrodes of said two transistors connected in common and the drain electrodes of said two transistors connected in common, each stage except the first further including an input line from a preceding stage connected to said source electrodes of said first transmission gate, each stage except the last further including an output line to the next succeeding stage connected to said drain electrodes of both said transmission gates, each said stage further including a stage control input connected to said source electrodes of said second transmission gate and two stage input lines carrying complementary binary signals connected respectively to the opposite gate electrodes of both transmission gates, and further including a C-MOS logic circuit having two inputs receiving corresponding digits of two input data words, and first, second and third outputs delivering respectively the logical non-equivalence, the logical equivalence and the logical NAND function of said digits on said two inputs, said first and second outputs being connected respectively to said two stage input lines and said third output being connected to said stage control input.

3. An adder circuit according to claim 2, wherein each stage further includes third and fourth C-MOS transmission gates each comprising p-channel and n-channel MOS transistors having respective source electrodes connected in common, respective drain electrodes connected in common and respective gate electrodes, said third and fourth transmission gates receiving said complementary binary signals together with any carry input to the stage from a preceding stage and deriving therefrom the sum output of the stage.

* * * * *